United States Patent Office 3,492,736
Patented Feb. 3, 1970

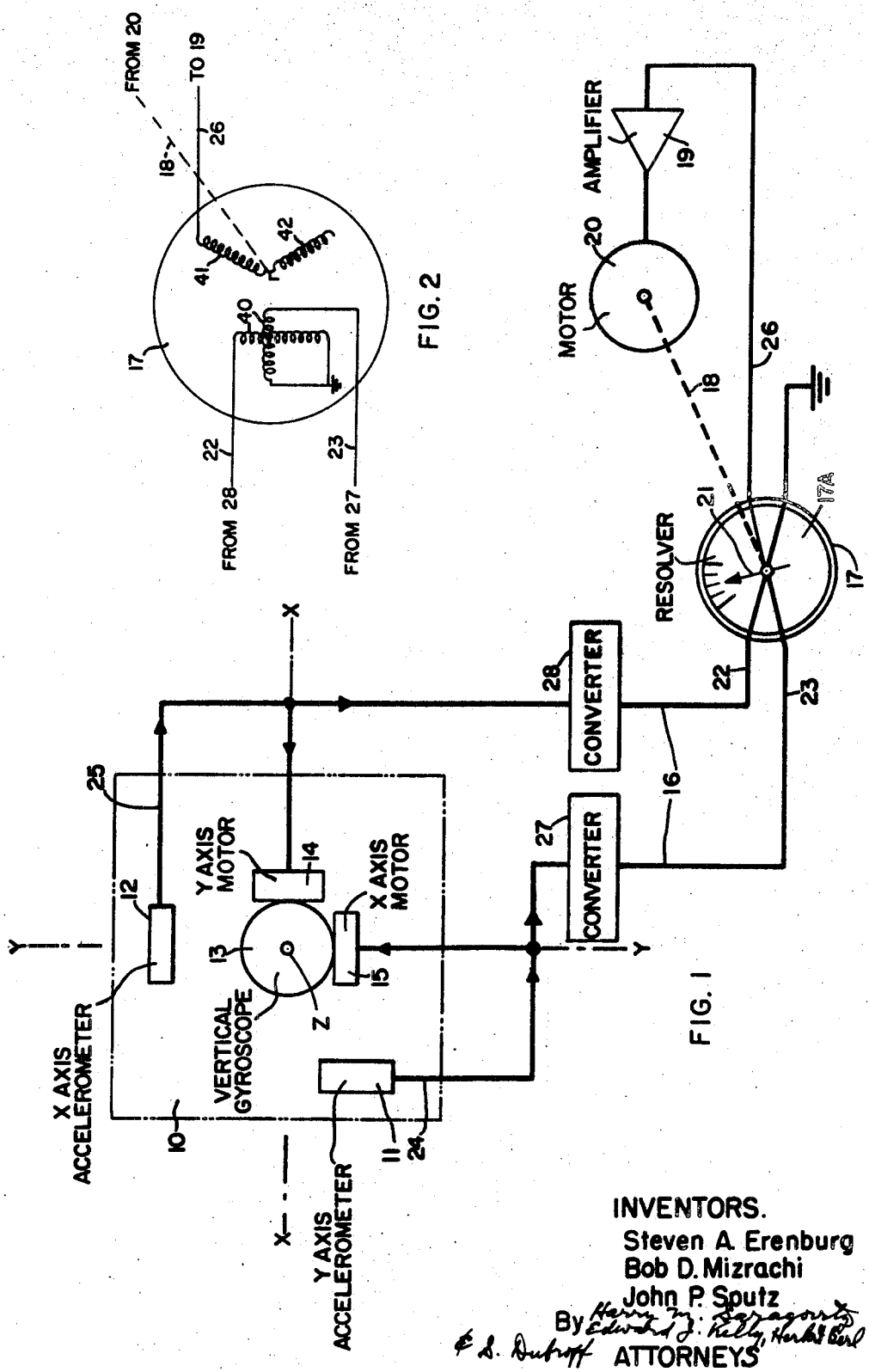

3,492,736
NAVIGATION SYSTEM
Steven A. Erenburg, Passaic County, N.J., Bob D. Mizrachi, Prince Georges County, Md., and John P. Sputz, Bergen County, N.J., assignors, by mesne assignments, to the United States of America as represented by the Secretary of the Army
Filed Aug. 1, 1967, Ser. No. 657,715
Int. Cl. G01c 19/34
U.S. Cl. 33—226                                  10 Claims

ABSTRACT OF THE DISCLOSURE

An azimuth computing device is provided with a gyroscope and accelerometers located on a platform which is supported to pivot about perpendicular coplanar axes in response to gyroscope precession. Accelerometer signals caused by platform pivoting are fed into a resolver which computes azimuth orientation and produces a visual readout.

---

It is old in the art to use a magnetic compass to determine the location of North and it is also old to use optical systems such as sextants to determine azimuth orientation. Another method, of more recent vintage, uses a pendulous gyrocompass to determine the North azimuth.

Associated with each of these aforementioned methods are certain disadvantages. The magnetic compass lacks accuracy and the other two methods require a long period of time before accurate readings can be obtained.

It is therefore a principal object of this invention to provide a system which can determine azimuth orientation quickly and accurately.

It is a further object of this invention to provide a method of determining azimuth orientation in inertial systems.

The instant invention utilizes an electro-mechanical computational technique to determine an azimuth relative to a known geographical point such as the North Pole. Briefly stated, a platform mounted gyroscope is permitted to precess and to cause a pre-leveled platform to tilt about perpendicular and coplanar X and Y platform axes. Accelerometers located on the platform coaxially with these axes detect components of gravitational acceleration when the platform is tilted. The amount of tilt about these axes is an indication of the misalignment of the X and Y axes with respect to North. Electrical signal currents from the accelerometers are fed into a resolver, the rotor shaft of which is coupled to a motor. The motor is electrically motivated by resolver output signal currents and rotates the resolver shaft in a direction to null the current in the resolver output circuit. The resolver shaft angle at null current is representative of the orientation of the platform axes with respect to North.

These and other objects, features and advantages will be better understood by reference to the following specification taken in conjunction with the accompanying drawings wherein FIG. 1 is a schematic diagram of a preferred arrangement embodying the principles of the invention; FIG. 2 is a schematic diagram of the resolver of FIG. 1.

Platform 10, having mutually perpendicular X, Y and Z axes as shown, is supported by a three gimbal arrangement which provides for free platform pivoting about its X and Y axes. Located on platform 10 with its rotor axis along the Z axis, is vertical gyroscope 13. In a preferred embodiment of the instant invention gyroscope 13 has two degrees of freedom. This permits precession about X and Y gyroscope axes, which axes are aligned with X and Y platform axes. It should be noted that two gyroscope each having a single degree of freedom would constitute mechanical equivalents of the preferred gyroscope.

Also located on platform 10 are X axis accelerometer 11 and Y axis accelerometer 12. The equivalence of these single axis accelerometers with respect to a double axis accelerometer should be readily apparent. Accelerometer outputs 24 and 25 are electrically connected to resolver inputs 23 and 22 respectively. It is preferable if these accelerometers produce an alternating current signal in response to a sensed acceleration; however, if direct current signals are produced they may be changed into alternating current by means of corresponding converters 27, 28 placed in series between respective resolver inputs 23, 22 and accelerometer outputs 24, 25.

Coupled to gyroscope 13, and for the purpose of rotating it about its X and Y axes, are Y axis torquer 14 and X axis torquer 15. These torquing means are electrically connected to accelerometer outputs 25 and 24 respectively and are actuated by electrical signals from the corresponding accelerometers 11 and 12.

Electrically perpendicular stator windings 40 of resolver 17 are connected to resolver inputs 22 and 23. Resolver 17 has two rotor windings 41 and 42, respectively. Winding 41 is connected to output 26 while winding 42 is open. One side of both the stator windings 40 and rotor windings 41 and 42 is grounded. It is obvious that a resolver having a single rotor winding could be employed equally as well.

Amplifier 19 is connected to resolver output 26 and amplifies the resolver output signals. These amplified signals are fed into motor 20 which is mechanically coupled to resolver rotor shaft 18. Attached to resolver 17 is a graduated dial 17A, the pointer 21 of which is securely attached to resolver rotor shaft 18. The dial and pointer provide a visual reference indication of the resolver shaft position. Means other than visual reference may be used to determine resolver shaft position and in complex systems it may be desirable to use a "synchro" system to produce an electrical output signal.

The operation of the present invention is based on the electro-mechanical solution of a mathematical equation. In maintaining its orientation in inertial space, neglecting inherent gyroscope drift, vertical gyroscope 13 will relative to the local level, appear to drift about its X axis at a rate equal to $W_e \cos \lambda \sin \psi_e$ and about its Y axis at $W_e \cos \lambda \cos \psi_e$, wherein the earth's rate of rotation about its axis is represented by $W_e$, $\lambda$ is the latitude at which the unit is being operated and $\psi_e$ represents the angle of misalignment of gyroscope X and Y axes with respect to North and East, respectively. If platform 10 is initially level so that its Z axis is vertical and the accelerometers sense no components of gravitational acceleration, then gyroscope apparent drifts represented by these equations will thereafter cause platform 10 to tilt about its X and Y axes. When tilted about its X axis, accelerometer 11, positioned to sense acceleration along the Y axis, will sense a component of gravitational acceleration and will produce an electrical output signal. This signal is fed into Y axis gyroscope torquer 15 and resolver input 23.

This signal causes torquer 15 to rotate gyroscope 13 and platform 10 in a direction to reduce the tilt of the platform about its X axis. Rotation continues until the platform 10 is no longer tilted about its X axis, whereupon the accelerometer 11 senses no gravitational acceleration and ceases to produce an output signal.

When the platform is tilted about its Y axis, X axis accelerometer will sense a component of gravitational acceleration and produce a signal. This signal is fed into resolver input 22 and Y axis torquer 14, and causes torquer 14 to rotate gyroscope 13 in a direction to reduce the tilt of the platform about its Y axis. Again rotation continues until platform 10 is no longer tilted about its Y axis and the accelerometer 11 produces no output signal.

The aforementioned electrical signal currents produced by the accelerometers, and fed into resolver inputs 22 and 23, are proportional to the rate of gyroscope tilt about its X and Y axes; that tilt itself being proportional to the misalignment of X and Y gyroscope axes with respect to North. For a given rate of tilt about the X gyroscope axis, Y axis accelerometer will produce an electrical current magnitude equal to $KW_e \cos \lambda \sin \psi_e$ and for a given rate of tilt about the Y gyroscope axis, X axis accelerometer will produce an electrical current magnitude equal to $KW_e \cos \lambda \cos \psi_e$. These two accelerometer signals will hereinafter be referred to as A and B, respectively.

Electrical output currents of resolver 17 are a function of the angular position of resolver rotor shaft 18. Mathematically stated, $I_o = B \sin \theta - A \cos \theta$, where $I_o$ is the resolver output current, $\theta$ is the rotor shaft angle with respect to the resolver magnetic field, and A and B are the aforementioned accelerometer currents. Accelerometer currents A and B will set up a magnetic field in resolver 17. Resolver electrical null is achieved when the rotor is positioned with respect to this field so that no output current $I_e$ proportional to $\theta$, the angle between the rotor position and electrical null, will be induced in the rotor. This current is amplified by amplifier 19 and fed into motor 20. Motor 20 will then rotate resolver rotor shaft 18 through the angle $\theta$ in a direction to null the resolver output current $I_o$. When $I_o$ is zero, $B \sin \theta = A \cos \theta$, $\theta = \tan^{-1} A/B = \tan^{-1}(KW_e \cos \lambda \sin \psi e / KW_e \cos \lambda \sin \psi e) = \tan^{-1}(\tan \psi e) = \psi e$. Therefore $\theta = \psi e$, and the angle $\theta$, through which resolver rotor has been rotated, is seen to be equal to $\psi e$, the angle of misalignment between the gyroscope axes and North. By means of dial 17A and pointer 21, the new angular position of the resolver shaft may be compared with that shaft position when the platform was initially leveled at a known relative to the earth's surface.

Certain modifications, alterations or changes may be resorted to without departing from the scope of the invention.

We claim:
1. A gyrocompass comprising:
 a platform having fixed therein perpendicular X and Y axes defining a normally horizontal plane, and means pivotally mounting said platform about each of said X and Y axes and for leveling said plane;
 gyroscope means on said platform pivotally mounted for alignment of the rotor axis thereof with an axis normal to said plane;
 accelerometer means on said platform positioned to sense components of gravitational acceleration along said X and Y axes, said accelerometer means producing electrical currents in response to sensed accelerations;
 means including gyroscope torquing means, controlling platform pivoting about said X and Y axes in response to said accelerometer currents;
 resolver means having stator windings and at least one rotor winding, said stator windings being in electrical communication with said accelerometer means;
 an electric motor mechanically coupled to a resolver rotor shaft and in electrical communication with said resolver rotor winding, said motor rotating said rotor shaft in response to a resolver rotor current and in a direction to reduce said resolver rotor current; and
 position indicating means connected to said resolver rotor shaft.

2. The arrangement of claim 1 wherein said gyroscope means includes a two degree of freedom gyroscope.

3. The structure of claim 1 wherein said accelerometer means includes two single axis accelerometers producing alternating currents.

4. The arrangement of claim 1 having means, intermediate said resolver and accelerometer means, for converting direct accelerometer current into alternating current, an amplifier electrically connected between said rotor winding and said motor, and said indicating means including a graduated dial and a pointer attached to said resolver rotor shaft.

5. A gyroscompass comprising:
 a platform having mutually perpendicular X, Y and Z axes;
 means mounting said platform for pivoting about said X and Y axes and for alignment of said Z axis with vertical;
 gyroscope means on said platform positioned to pivot said platform in response to gyroscope precession;
 accelerometer means on said platform positioned to sense gravitational acceleration components along said X and Y axes, said accelerometer means producing electrical output signals in response to sensed accelerations;
 gyroscope torquing means controlling platform pivoting in response to said accelerometer output signals;
 resolver means having input windings and at least one output winding, said input windings electrically communicating with said accelerometer output signals;
 a motor connected to said resolver, in electrical communication with said resolver output winding and rotating said output winding in response to the resolver output, said rotation being in a direction to reduce said signals; and
 position readout means responsive to said output.

6. The arrangement of claim 5 wherein said gyroscope means includes a two degree of freedom gyroscope.

7. The structure of claim 5 wherein said accelerometer means includes two single axis accelerometers.

8. The arrangement as defined in claim 5 having, intermediate said resolver and accelerometer, means for converting direct accelerometer current into alternating current.

9. The arrangement as defined in claim 5 having an amplifier electrically connected between said resolver output winding and said motor.

10. The arrangement as defined in claim 5 wherein said resolver includes a rotor shaft and said readout means includes a graduated dial and a pointer attached to said resolver rotor shaft, said dial and pointer providing visual indication of said resolver shaft position.

References Cited

UNITED STATES PATENTS

| | | |
|---|---|---|
| 1,644,921 | 10/1927 | Henderson. |
| 1,932,412 | 10/1933 | Keen. |
| 2,293,039 | 8/1942 | Esval. |
| 2,573,626 | 10/1951 | Taylor. |
| 3,279,086 | 10/1966 | Schlitt et al. |

ROBERT B. HULL, Primary Examiner

U.S. Cl. X.R.

33—204